3,272,620
OBTAINING URANIUM VALUES FROM BURNT LIGNITES

Adolph E. Meyer, Wheatridge, and Mayer B. Goren, Golden, Colo., assignors to Kerr-McGee Oil Industries, Inc., a corporation of Delaware
No Drawing. Filed Feb. 25, 1964, Ser. No. 347,652
17 Claims. (Cl. 75—84.1)

This invention broadly relates to a process for burning carbonaceous materials containing desired metal values, and to an improved process for recovering desired metal values from the resulting ash. In one of its more specific variants, the invention relates to the ashing of carbonaceous fuels containing uranium to thereby provide an ash which is amenable to the recovery of uranium values therefrom by leaching.

The present invention will be described and illustrated hereinafter with specific reference to uranium bearing lignite. However, it is understood that carbonaceous fossil materials in general containing desired metal values may be processed in accordance with the present invention. Specific examples of such substances include oil shale, bituminous and sub-bituminous coal, tars, natural asphalt, etc. Usually such materials contain sufficient carbonaceous material to support combustion when air is supplied thereto. However, it is understood that the invention is also useful in ashing carbonaceous materials which do not support combustion, and in such instances a desired substance rich in carbonaceous material may be added in quantities sufficient to result in a mixture that does support combustion.

It is well known that many lignite deposits, including those found in the United States in the North and South Dakotas and in other parts of the world, contain significant quantities of valuable minerals such as minerals of uranium, molybdenum, germanium, etc. The deposits are vast and constitute large potential supplies for the contained valuable minerals provided they can be processed economically. Unfortunately, in most instances the desired metal values are present in such small quantities as to render the prior art processes for their recovery uneconomic by most commercial standards.

The uranium content of lignite ores from the Dakotas may be solubilized in a number of ways, such as by mineral acid or alkaline (preferably carbonate) leaching of the raw lignite, or leaching of ash derived from burning of the lignite. Processing of the raw lignite by acid or carbonate leaching is subject to many operational difficulties, particularly in the separation of leach liquor from the gangue constituents, and it is not generally commercially attractive. The moderately low molecular weight carbonaceous constituents of the lignite seem to be peptized and solubilized under the leach conditions, and contaminate the leach liquor and prevent settling or filtration of the pulps. Also, uneconomic quantities of reagents are consumed by the reactive organic substances and even at high reagent dosages extraction of the desired mineral constituents such as uranium is very poor.

Processing of lignite ash on the other hand is much simpler as the humic constituents have been destroyed by the burning process and no longer are present to consume reagents and produce the colloidal suspensions that normally interfere with thickening or filtration when treating the original ore. However, often the ash does not respond to the usual leaching conditions, and the efficiency of extraction of the valuable metal constituents by acid leaching or other leaching processes is reduced to insignificant levels.

Heretofore the burning of lignite for producing ash for leaching processes has been conducted either with the ore in place in the mine, which is an uncontrollable process, or in fluo solid roasters which are expensive to build and operate. The burning of lignite in place in the ore bed is restricted to those lignites rich enough in carbonaceous material to support combustion in practical processes, and lower grade lignites cannot be economically processed in this manner to provide an operative, readily controlled process. The art has long sought an economic process for ashing lignite and other carbonaceous ores containing valuable metal constituents which is cheap and simple in operation, effective to produce an ash that responds to usual leaching conditions, and economically attractive without requiring a large initial capital outlay. However, prior to the present invention such a process was not available although its great need has long existed in this art.

It is an object of the present invention to provide a novel process for burning carbonaceous fossil materials containing desired metal values to thereby provide an ash which may be processed for recovery of the metal values.

It is a further object to provide an improved process for leaching desired metal values from ash produced by burning carbonaceous fossil materials.

It is still a further object to provide an improved process for burning carbonaceous fossil fuels which contain a substantial percentage of fines that tend to cause channeling during the burning process with accompanying uneven burning of the fuel.

It is still a further object to provide an improved process for burning carbonaceous fossil fuels whereby the resultant ash is more amenable to leaching.

Still other objects and advantages of the invention will be apparent to those skilled in the art upon reference to the following detailed description and the examples.

In accordance with the present invention, carbonaceous materials such as uranium bearing lignite ores are processed by steps including oxidative burning of the carbonaceous content under controlled, yet simple conditions that allow the use of inexpensive equipment and inexpensive operating conditions. In one embodiment of the invention, a pit is provided with a spider or network of perforated conduits which may be placed along the bottom of the pit. The conduits may be supplied with an elemental oxygen-containing gas under pressure, and preferably with a forced air supply leading from a compressor or blower. Raw lignite is loaded into the pit to a desired level, ignited in place and maintained burning at a rate that will assure a temperature within the desired limits. The control of temperature is achieved by the rate of air input into the bottom of the ore bed.

Preferably, the ore is ignited and the burning initiated at the bottom of the pit, and this may be achieved in a number of ways. By one process, a thin charge or a rich carbonaceous fuel such as coal, charcoal, etc. is placed on top of the air distributors and ignited in the usual manner and kept burning by a stream of air issuing from the air distributor. When the igniter is burning satisfactorily, a charge of raw lignite which may be wet as obtained from the mine, is placed on top of the burning coal and this may be continued until a relatively deep bed is formed. The hot burning charge at the bottom of the pit dries the lignite immediately above it and gradually brings it to ignition temperature, and the burning is maintaned at the desired rate by controlling the air input into the system. In this manner, lignite burning at any given level dries the lignite immediately above it and eventually brings it to igniton temperature, thereby resultng in eventual burning of the entire bed. Due to the deep lignite bed and the air supply as indicated, even very low grade lignites tained by blending very low grade lignite with higher grade lignite or with a richer carbonaceous fuel.

In a second mode of operation, a thin charge of lignite such as 1–2 inches may be placed on top of the air distributor. This is ignited by mixing a combustible gas such as natural gas, butane, methane, or gasified heavier hydrocarbons with the airstream being fed into the distributor until the thin lignite charge is burning satisfactorily. Then, the remainder of the lignite may be loaded thereon and the combustible gas feed is stopped when this is burning satisfactorily. If needed, additional rich carbonaceous fuel may be fed to the burning lignite at any time when the combustion is not reaching satisfactory levels.

In still another method of igniting the charge, the air being fed to the distributor is preheated to a high temperature sufficient to dry the lignite at the bottom of the bed and bring it to ignition temperature. This has the effect of requiring less rich carbonaceous fuel material to assure adequate combustion since less heat is required to bring the lignite to its ignition temperature and to support combustion of additional lignite.

As will be apparent to those skilled in the art, the principles outlined above may be established in a number of ways and numerous refinements are possible. For instance, the pit mentioned may be fashioned in a manner to provide a grate and door at the bottom thereof such as will allow for continuous feeding of the raw lignite to be burned at the top of the grate and discharge of burned ash at the bottom or side of the grate. Also, instead of an earthen pit or a shaft, a metal or concrete container may be used in a batch, continuous or semi-continuous operation that does not depart from the spirit or scope of this invention. For proper control, the pit or shaft may be fitted with thermocouples or other temperature measuring devices that monitor the temperature and may be adapted to control the temperature of the burning charge.

The process described herein is very satisfactory for controlling burning conditions and producing lignite ash that is readily amenable to simple leaching conditions for the recovery of the desired metal value. However, fines produced in the mining or subsequent handling of the lignite and especially material less than $1/32''$ in size usually results in channeling within the burning bed. The flame front may be more difficult to control and does not move vertically through the bed at a controlled, uniform rate, thereby leaving behind unburned areas of lignite which are bypassed by the flame front and thus remain unburned. When the channeling becomes very aggravated such as by blowing holes through the bed, very rapid and hot burning takes place along the channels and this results in an ash which is very difficult to process by simple leaching conditions.

It has been further discovered that pelletizing, briquetting or other means for agglomerating the fines to a desirable size allowing ready burning, will minimize channeling and allow more uniform burning rates and temperatures to be achieved. Thus, preferably the lignite is pelletized or briquetted prior to burning. On a laboratory scale, the pelletizing may be done with a simple piece of hand equipment designed for the purpose of enlarging the particle size of the fines, but on a large scale it is preferred to employ a rotating drum or the well known "Flying Saucer" widely used in the art for rapid production of pellets of any desired size. It is only required that the raw lignite be mixed with sufficient water or other pelletizing medium known to the art, and the mixture rotated or tumbled to produce pellets of the desired size. Experience has shown that usable pellets or briquettes may range from about $1/32''$ in diameter up to several inches such as 3 or 4 inches, or even larger in some instances. The resulting pellets or briquettes need not be unusually hard, but they should maintain their shape under significant pressures and not shatter when dropped into particles which are of a size resulting in channeling of the lignite and the problems discussed above.

The moisture content of the pellets or briquettes may vary over wide ranges, such as from 10–15% to as high as 70%, but usually a moisture content of about 40–50% based on dry raw lignite is preferred. When such a moisture content is present, the burning properties of the pellets are not adversely affected in most instances, provided sufficient heat is produced in the burning of the lignite charge to dry the lignite immediately above it and bring it to the ignition temperature. In instances where a rich lignite is not available for burning, the practical upper limit on the amount of water used in the pelletizing operation is that amount which may be evaporated and the lignite charge heated to ignition temperature upon combustion of the lignite.

The pellets may be stored or used immediately in the burning step, and the burning step usually proceeds as satisfactorily in the presence of the added water as it does with raw lignite when sufficient heat is present to evaporate the water and bring the charge to an ignition temperature. Elimination of the fines from the lignite charge is achieved in this manner and a porous bed of lignite is produced which allows uniform air distribution throughout the charge. The flame front advances uniformly across the bed so that excellent control of the temperature is achieved and substantially all of the carbonaceous constituents of the lignite are burned thereby leaving only ash which is readily amenable to processing for the recovery of the desired metal values.

A further unexpected improvement which results from the pelletizing of the lignite fines is that the pellets have been found to survive the burning step remarkably well thereby resulting in ash which is agglomerated. Storage or trucking of the ash is more feasible than ash from non-pelletized material, which is often subject to aggravated dust losses. The tendency of the lignite ash to retain the form of the pellet renders the subsequent processing of the ash easier and with less loss than would otherwise be the case. When it is desired, the pellet ash may be re-pelletized with water or other pelletizing medium to thereby minimize even further the small amount of fines present. Also, the ash from the unpelletized ore may be pelletized, and thereby achieve a particle size which is more satisfactory for handling.

When practicing the invention, raw lignite may be economically, conveniently and dependably ashed to produce a product readily amenable to further processing for the solubilizing of the valuable metal constituents. If desired, various reagents may be mixed with the lignite prior to the burning step to achieve improved results and additional solubilization of constituents difficult to solubilize. In some instances, prior to burning one or more materials rendering the desired metal values more soluble upon ashing are added such as 1, 5, 10, 15–20% by weight of sulfur, sulfuric acid, sodium chloride, sodium carbonate, etc. The subsequent burning step is practiced as described herein and it proceeds as uniformly as when the solubilizing substance is not present.

The present invention provides for the first time a process for economically burning lignite having a large percentage of fines present, such as 5, 10, 30, or 50% fines, of a size not greater than $1/32''$ in diameter to produce an ash amenable to leaching. While air is normally the preferred elemental oxygen-containing gas for use in practicing the invention, it is understood that elemental oxygen, or elemental oxygen admixed with air or other diluent gas may be used. Thus, in instances where a charge is very difficult to burn, it may be desirable in some instances to employ oxygen or oxygen-enriched air to thereby achieve a more satisfactory burning rate.

The present invention is especially useful in the processing by burning of lignites which are relatively poor in carbonaceous constituents and thus normally are hard to burn. It is preferred that a relatively deep contained body of the ore be burned, such as a body at least 1, 5, 10 or 15–25 or more feet in depth.

In accordance with another important variant of the invention, ash resulting from the burning of metal bearing carbonaceous material is subjected to an acid cure with mineral acid prior to leaching to thereby reject silica which is always present in the ash and produce a leach liquor low in solubilized silica. This may be accomplished by admixing the ash with a suitable mineral acid, such as sulfuric acid, and then allowing the mixture to acid cure prior to leaching for at least 4 hours and preferably for at least 8 hours. The ash may be acid cured for a much longer period of time if desired such as 20, 24 or 30 hours or longer, but the preferred time is usually 8 to 16 hours. The amount of mineral acid admixed with the ash may vary over wide ranges, but usually about 25–150%, and preferably about 50 to 100%, of that quantity of mineral acid normally required for leaching the ash may be employed in the acid curing step. The preferred acid curing temperature often is less than 50° C. as it has been found that lower temperatures result in an even lower solubilized silica content in the leach liquor. The ash may be pelletized with the mineral acid and water as necessary to provide sufficient moisture for forming pellets readily and the pellets acid cured and leached.

The acid cured ash may be leached following prior art practice with an aqueous medium which may be aqueous sulfuric acid or other suitable mineral acid, or water in instances where there is sufficient free mineral acid therein to result in the desired pH value in the final leach. Preferably, the ash is pelletized with the mineral acid and the leach is carried out on the acid cured pellets at a low temperature such as less than 50° C. This procedure has been found to assure a high recovery of the desired metal values and a very low solubilized silica content in the leach liquor.

Acid curing of the ash is especially effective in leaching both molybdenum and uranium values from ash containing these substances, and due to the lower solubilized silica content the resulting leach liquor may be easily processed by solvent extraction or ion exchange to recover the molybdenum and uranium values. In instances where the ash is not subjected to the acid curing step, the solubilized silica content of the leach liquor normally is so high that it is impossible to carry out a practical solvent extraction or ion exchange process for the recovery of the molybdenum or uranium values without first pretreating the leach liquor.

The foregoing detailed description and the following specific examples are for purposes of illustration only and are not intended as being limiting to the spirit or scope of the appended claims.

*Example I*

A composite of a variety of South Dakota raw lignite was prepared having the following composition:

| | Percent |
|---|---|
| Moisture | 32 |
| $U_3O_8$ | [1] 0.275 |
| Mo | [1] 0.26 |
| $CaCO_3$ | [1] 4.30 |
| Loss on Ignition (425° C.) | 57 |

[1] Dry basis.

The composite contained lumps up to about three inches in size but was powdery for the most part. It was placed on a supporting screen and ignited by means of a Bunsen burner, but the burning could not be maintained.

*Example II*

A crushed charge of raw ore as in Example I was placed in a one inch diameter column to a height of 10–12 inches, and supported on a perforated plate fused at the bottom of the column. A slow stream of low pressure air was introduced at the bottom of the column and heat was applied through the glass (by means of a Bunsen burner) to a small area at the bottom of the charge. The lignite ignited and was maintained glowing and burning at any desired rate merely by adjusting the air flow rate. In this manner, the entire charge was burned in a period of less than an hour.

*Example III*

The process of Example II was repeated several times. In several instances the charge was premixed with 10% its weight of powdered sulfur. In other instances, the charge was pugged with 30% and 15% its weight of concentrated sulfuric acid. Ignition and burning were carried out as in the preceding example with equally good results. In still other tests, 10% powdered sodium carbonate and 10% sodium chloride, respectively, were admixed with the raw lignite before burning. All of these behaved satisfactorily.

*Example IV*

A pit was dug, 1 foot deep and 18 inches by 8 inches in dimension. An air distributor consisting of several 6-inch sections of ½ inch pipe perforated with 1/16 inch holes was placed at the bottom of the pit and covered with a layer of coarse gravel topped by a fine screen. A charge of raw lignite about one inch deep was placed on the screen and a mixture of natural gas and air was admitted through the distributor and ignited. In a few minutes, the lignite charge was burning in several spots, at which point gas feed was discontinued. Air feed was maintained and the pit was filled with raw wet lignite having size distribution from fines (−28 mesh) up to several inches in dimension. Burning was controlled by the air feed rate in such a fashion that the charge was consumed in just less than 24 hours. There was some evidence of channeling due to blowing out of fines and hot spots would form in these channels (temperatures exceeding 800° C.) and about ten percent of the charge was found to be clinkered.

In subsequent tests at lower air flowrates, channeling was minimized and the charge was burned in some 48 hours. A charge of 44 pounds of raw wet lignite yielded 15 pounds of ash.

*Example V*

A thirty gallon drum with the heads cut out to leave a three inch lip was placed on a device for rolling. For pelletizing, 33 pounds of raw lignite as received (about 35% moisture) was fed in portions to the rotating drum along with 4½ pounds of water which was sprayed on with an atomizer. Pellets ranging in size from small buckshot to pellets several inches in girth were produced very easily in the tumbling operation.

Subsequent tests showed that pelletization proceeded very rapidly when considerable quantities of water were merely thrown into the drum, no particular care having to be exercised. The pellets thus produced were fairly hard, did not shatter on dropping and yet could be crushed with the fingers.

For burning operations, the bottom of a five gallon can was fitted with a perforated copper tubing spiral which supported two layers of screen. A couple of crushed charcoal briquettes were placed on the screen, ignited with kerosene and air admitted through the distributor to force the charcoal to burn at higher temperature. At this point, the can was filled with pellets produced from the 33 pounds of lignite and rapid air feed rate examined. Within two hours, peripheral burning had proceeded to the top of the charge while the center had not burned completely six hours later.

Peripheral temperatures, because of the very high air feed rates, exceeded 1200° C. and much clinkering occurred.

In subsequent runs at even higher air feed rates peripheral burning was complete in some 25 minutes and the entire charge was consumed in three hours. With unpelletized lignite, most of the fines would have been blown out at the air feed rates examined.

*Example VI*

Thirty-four and one-fourth (34.25) pounds of raw lignite was pelletized in the drum of Example V with 4.7 pounds of water. Three to four pounds of ore was placed in the rotating drum and water added until pellets began to form. When the pellets became sticky, more ore was added, and as the surface dried, more water was added.

The pelletized ore was placed on a base of ignited charcoal in the five gallon bucket of Example V. Initial air flow of 60 l./minute was cut to 38 l./minute after ½ hour and eventually to 10½ l./minute. In 24 hours, the bed had dropped three inches and was still burning. At the center of the bed, temperature as measured by a thermocouple was 475° C. near the bottom and about 625° C. one inch from the top. In 48 hours, the burn was complete. Burning was very uniform with no evidence of any clinkering.

*Example VII*

Pelletizing of raw lignite containing individual pieces up to three to four inches in size proceeds very rapidly in the equipment known to the art as the "Flying Saucer." A four foot diameter "Flying Saucer" operating at about 20–25 r.p.m. is capable of pelletizing in excess of 500 pounds of lignite an hour. With various samples of lignite, the following pelletizing rates were observed:

| Sample | Pounds | Time (min.) |
|---|---|---|
| 1 | 273 | 25 |
| 2 | 457 | 20 |
| 3 | 165 | 11 |
| 4 | 279 | 45 |
| 5 | 239 | 24 |
| 6 | 267 | 45 |

Sample 4 was wet enough as mined so as not to require addition of any water to achieve pelletizing. Sample 6, on the other hand, was very powdery and dry as received and required about 50% its weight of water to achieve pelletizing.

In practice, it is preferred that agglomerates or particles over three to four inches in one dimension be separated from the remainder of the ore prior to pelletizing.

Pellets produced in the "Flying Saucer" can run the size gamut from about 1/16 inch all the way up to six to seven inches in diameter depending upon the conditions under which they are produced, principally upon residence time, and are tough enough to survive long drops without shattering.

*Example VIII*

Raw lignite ore is fed to a surge bin provided with a gate leading to a vibrating feeder. The feeder supplies ore to a four foot diameter "Flying Saucer" provided with a spray head through which water can be fed simultaneously with the ore at desired rates. Pellets for the "Flying Saucer" are discharged onto a flite conveyor and fed to an 18 ft. tall vertical burner for ashing. The burner is constructed of three 6-foot sections, 9 sq. ft. in cross section, the bottom section being provided with an IGL ventilating blower 15P (pressure type) capable of delivering 330 c.f.m. at six inches back pressure. A six inch line provided with a sliding gate for controlling air flow leads to an inverted V shaped steel plate welded into the bottom section of the burner. The plate is provided with 24 one inch diameter holes to serve as air distributors, the holes being protected by 1½" x 2" steel caps welded into positions one inch above each opening. A second squirrel cage blower (low pressure) provided with a Venturi mixing device and inlet for natural gas also feeds into the space beneath the inverted V air distributor. The inverted V is closed by a welded steel plate at the bottom so that any gases fed to the V can exit only through the 24 one-inch diameter openings in the legs of the V. The V distributor is welded flush to two sides of the bottom section, the remaining two sides having six inch gaps through which ash may be discharged to doors below, allowing access to the ash. In addition, the bottom section as well as the middle section of the burner is provided with two and three grids, respectively, of ¼" x 2" x 2" angle iron forming a grid of nine openings each about 100 sq. inches in area, the grids serving to alleviate packing and bridging of the charge.

Natural gas and air are fed to the V distributor and ignited, and a shallow charge of pelletized lignite is fed to the burner. When it is ignited and burning satisfactorily, air is supplied by the IGL blower and the auxiliary igniting air and gas feed is discontinued. Pelletized lignite is then fed to the burner and discharged underneath at rates controlled by the rate of air feed. Two thermocouples in each of the six foot sections of the burner allow for continuous monitoring of temperatures within the bed and indicate when adjustment in air feed rate should be made.

*Example IX*

Lignite ash produced in Examples V and VI were subjected to acid leaching amenability tests for extraction of the uranium. In a typical test, lignite ash was mixed with an equal weight of water and reduced in a small rod mill to −35 mesh. The milled product was collected, the mill being washed out with excess water and the pulp thickened by addition of a polyacrylamide flocculant. The thickened pulp at 37% solids was then agitated and heated with sulfuric acid (600 pound/ton of ash) and sodium chlorate (2 pound/ton of ash), the temperature of the stirred pulp being maintained near 90° C. for 18 hours, when the pulp was filtered and washed and products analyzed.

The ash from very rapid and hot burning of lignite (Example V) was quite intractable to acid leaching, allowing solubilization of only some 35% of the uranium content. On the other hand, the ash produced in the 48 hour burning (Example VI) responded very well to the leaching treatment, uranium extraction being in excess of 87%. It is thus evident that uncontrolled rapid burning confers intractability onto the ash while controlled slow low temperature burning yields an ash that responds well to leaching of the uranium content.

*Example X*

This example illustrates the process of the invention for acid curing the ash.

Ash produced in accordance with the process of Example VI is admixed with sulfuric acid in an amount calculated to provide one-half of the acid required for leaching. Water is added in an amount to provide sufficient moisture for pelletizing and the mixture is pelletized. The resulting mixture of ash and sulfuric acid is allowed to acid cure in the form of pellets for 16 hours while maintaining a temperature below 50° C. At the end of the acid cure, the pellets of ash are subjected to leaching with aqueous sulfuric acid to thereby produce a uranium-containing leach liquor.

The uranium values may be recovered from the leach liquor by solvent extraction or ion exchange without first pretreating the liquor to reduce the solubilized silica content. Thus, a relatively small amount of the silica present in the ash is solubilized. However, when the same ash is leached with sulfuric acid in the absence of an acid cure, a large amount of silica is solubilized. In such instances, it is not practical to recover the uranium values from the leach liquor by either solvent extraction or ion exchange without first pretreating the liquor to reduce the solubilized silica content.

In instances where the ash contains both uranium values and molybdenum values, in accordance with the process of this example, it is possible to solubilize both the molybdenum and uranium and produce a leach liquor which contains a small amount of solubilized silica. The resulting leach liquor may be subjected to solvent extraction or ion exchange for the recovery of both the molybdenum and uranium values.

What is claimed:

1. A process for burning mined carbonaceous fossil fuel containing desired metal values and having a substantial amount of fines present comprising agglomerating the fines to provide particles having a size of at least 1/32 inch, preparing a bed of the mined carbonaceous fossil fuel including the agglomerated fines, igniting the prepared bed of fuel, supplying an elemental oxygen-containing gas to the ignited fuel, and passing the resulting gases of combustion through the bed of fuel in the general direction of the advancing flame front, the quantity of elemental oxygen containing gas supplied to the ignited fuel being sufficient to support combustion and being controlled in quantity to provide a desired temperature of burning.

2. A process for burning mined lignite containing desired metal values and having a substantial amount of fines present comprising agglomerating the fines to provide particles having a size of at least 1/32 inch, preparing a bed of the mined lignite including the agglomerated fines, igniting the prepared bed of lignite, supplying an elemental oxygen-containing gas to the ignited lignite, and passing the resulting gases of combustion through the bed of lignite in the general direction of the advancing flame front, the quantity of elemental oxygen containing gas supplied to the ignited lignite being sufficient to support combustion and being controlled in quantity to provide a desired temperature of burning.

3. A process for burning mined carbonaceous fossil fuel containing desired metal values and having a substantial amount of fines present comprising agglomerating the fines to provide particles having a size of at least 1/32 inch, preparing a bed of the mined carbonaceous fossil fuel including the agglomerated fines, igniting the bottom of the prepared bed of fuel, supplying an elemental oxygen-containing gas to the ignited fuel over a period of time sufficient to burn a desired quantity of fuel and produce ash, the elemental oxygen-containing gas being supplied to the bottom of the prepared bed of fuel and forced upward under pressure whereby the flame front advances in a generally upward direction and the resulting gases of combustion are passed upward through the bed of fuel in the direction of the advancing flame front, the quantity of elemental oxygen-containing gas supplied to the ignited fuel being sufficient to support combustion and being controlled in quantity to provide a desired temperature of burning.

4. A process for burning mined lignite containing desired metal values and having a substantial amount of fines present comprising agglomerating the fines to provide particles having a size of at least 1/32 inch, preparing a contained bed including mined lignite and the agglomerated fines, igniting the bottom of the prepared bed of lignite, supplying an elemental oxygen-containing gas to the ignited lignite over a period of time sufficient to burn a desired quantity of lignite and produce lignite ash, the elemental oxygen-containing gas being supplied to the bottom of the prepared bed of lignite and forced upward under pressure whereby the flame front advances in a generally upward direction and the resulting gases of combustion are passed upward through the bed of lignite in the direction of the advancing flame front, the quantity of elemental oxygen-containing gas supplied to the ignited lignite being sufficient to support combustion and being controlled in quantity to provide a desired temperature of burning.

5. The process of claim 4 wherein the elemental oxygen-containing gas is supplied to the ignited lignite in a quantity to control the temperature of burning at about 400–625° C.

6. A process for recovering metal values from mined carbonaceous fossil fuels containing desired metal values and having a substantial amount of fines present comprising agglomerating the fines to provide particles having a size of at least 1/32 inch, preparing a contained bed of the carbonaceous fossil fuel including the agglomerated fines, igniting the bottom of the prepared bed of fuel, supplying air to the ignited fuel over a period of time sufficient to burn a desired quantity of the fuel and produce ash, the air being supplied to the bottom of the bed of fuel and forced upward under pressure whereby the flame front advances in a generally upward direction and the resulting gases of combustion are passed upward through the bed of fuel, the quantity of air supplied to the ignited fuel being sufficient to support combustion and being controlled in quantity to provide a desired temperature of burning, leaching the ash to produce a leach liquor containing desired metal values, and recovering the desired metal values from the leach liquor.

7. A process for recovering uranium values from mined uranium-bearing lignite having a substantial amount of fines present comprising agglomerating the fines to provide a particle size of at least 1/32 inch, preparing a contained bed of the lignite including the agglomerated fines, igniting the bottom of the prepared bed of lignite, supplying air to the ignited lignite over a period of time sufficient to burn a desired quantity of the lignite and produce lignite ash, the air being supplied to the bottom of the bed of lignite and forced upward under pressure whereby the flame front advances in a generally upward direction and the resulting gases of combustion are passed upward through the bed of lignite, the quantity of air supplied to the ignited lignite being sufficient to support combustion and being controlled in quantity to provide a desired temperature of burning, leaching the lignite ash to produce a leach liquor containing uranium values, and recovering uranium values from the leach liquor to produce a uranium product.

8. The process of claim 7 wherein air is supplied to the ignited lignite in a quantity to control the temperature of burning at about 400–625° C.

9. The process of claim 7 wherein the lignite as mined contains insufficient carbonaceous material for supporting combustion and at least a portion of the lignite is burned in the presence of an auxiliary fuel relatively rich in carbonaceous material to thereby promote the combustion.

10. The process of claim 7 wherein at least one substance selected from the group consisting of sulfur, sulfuric acid, sodium carbonate and sodium chloride is mixed with the lignite prior to preparing the bed.

11. A process for recovering uranium values from mined uranium-bearing lignite containing fines comprising pelletizing the lignite to produce pellets at least 1/32" in size, preparing a contained bed of the pelletized lignite, igniting the bottom of the prepared bed of lignite, supplying air to the ignited lignite over a period of time sufficient to burn a desired quantity of the lignite and produce lignite ash, the air being supplied to the bottom of the bed of lignite and forced upward under pressure whereby the flame front advances in a generally upward direction and the resulting gases of combustion are passed upward through the bed of lignite, the quantity of air supplied to the ignited lignite being sufficient to support combustion and being controlled in quantity to provide a desired temperature of burning, leaching the lignite ash to produce a leach liquor containing uranium values, and recovering uranium values from the leach liquor to produce a uranium product.

12. The process of claim 11 wherein air is supplied to the ignited lignite in a quantity to control the temperature of burning at about 400–625° C.

13. A process for recovering metal values from mined carbonaceous fossil fuel containing desired metal values and having a substantial amount of fines present comprising agglomerating the fines to provide particles having a size of at least $1/32$ inch, preparing a bed of the mined carbonaceous fossil fuel including the agglomerated fines, igniting the prepared bed of fuel, supplying an elemental oxygen-containing gas to the ignited fuel, and passing the resulting gases of combustion through the bed of fuel in the general direction of the advancing flame front, the quantity of elemental oxygen containing gas supplied to the ignited fuel being sufficient to support combustion and being controlled in quantity to provide a desired temperature of burning, recovering the resulting ash containing the desired metal values, admixing the ash with mineral acid, allowing the admixture of mineral acid and ash to acid cure for a period of at least 4 hours to produce an acid cured ash, and then leaching the acid cured ash with an aqueous medium containing mineral acid to thereby extract the desired metal values, the desired metal values being selected from the group consisting of uranium values and molybdenum values.

14. The process of claim 13 wherein the acid cure and the leach are carried out at a temperature below 50° C.

15. The process of claim 13 wherein the ash contains uranium values, and the mineral acid is sulfuric acid.

16. The process of claim 15 wherein the ash is acid cured for at least 8 hours, and the acid cure and the leach are carried out at a temperature below 50° C.

17. The process of claim 16 wherein the ash also contains molybdenum values and is acid cured for about 8–16 hours, and the resulting leach liquor contains uranium values and molybdenum values.

References Cited by the Examiner

UNITED STATES PATENTS

| | | | |
|---|---|---|---|
| 2,819,145 | 1/1958 | McCullough et al. | 23—14.5 |
| 2,925,321 | 2/1960 | Mariacher | 23—14.5 |
| 2,954,218 | 9/1960 | Dew et al. | 23—14.5 X |

OTHER REFERENCES

Battelle Memorial Institute, Bulletin—237, "Recovery of Uranium from North Dakota Lignites," July 31, 1950, 51 pages.

AEC Documents WIN–54, April 1, 1957, 167 pages, of interest; WIN–81, Oct. 18, 1957, 142 pages, of interest.

BENJAMIN R. PADGETT, *Primary Examiner.*

CARL D. QUARFORTH, *Examiner.*

M. J. SCOLNICK, *Assistant Examiner.*